(12) United States Patent
Issler et al.

(10) Patent No.: US 11,566,945 B2
(45) Date of Patent: Jan. 31, 2023

(54) FASTENING DEVICE

(71) Applicant: GENTHERM GMBH, Odelzhausen (DE)

(72) Inventors: Markus Issler, Gersthofen (DE); Harald Schoppel, Aystetten (DE)

(73) Assignee: GENTHERM GMBH, Odelzhausen (DE)

( * ) Notice: Subject to any disclaimer, the term of this patent is extended or adjusted under 35 U.S.C. 154(b) by 277 days.

(21) Appl. No.: 16/771,421

(22) PCT Filed: Nov. 14, 2018

(86) PCT No.: PCT/DE2018/000332
§ 371 (c)(1),
(2) Date: Jun. 10, 2020

(87) PCT Pub. No.: WO2019/114849
PCT Pub. Date: Jun. 20, 2019

(65) Prior Publication Data
US 2021/0181030 A1    Jun. 17, 2021

(30) Foreign Application Priority Data

Dec. 13, 2017 (DE) .......................... 102017011524.9

(51) Int. Cl.
| | | |
|---|---|---|
| *G01D 5/245* | (2006.01) | |
| *G01K 1/14* | (2021.01) | |
| *G01K 7/22* | (2006.01) | |

(52) U.S. Cl.
CPC ................ *G01K 1/14* (2013.01); *G01K 7/22* (2013.01)

(58) Field of Classification Search
CPC .......... G01K 1/14; G01K 7/22; G01D 5/2451; G01B 7/30; G01P 3/487
See application file for complete search history.

(56) References Cited

U.S. PATENT DOCUMENTS

| | | |
|---|---|---|
| 2013/0130081 A1 | 5/2013 | Diez et al. |
| 2016/0265946 A1 | 9/2016 | Mase |
| 2017/0253142 A1* | 9/2017 | Buckhout ............. H01M 10/63 |

FOREIGN PATENT DOCUMENTS

| | | |
|---|---|---|
| DE | 1833249 U | 6/1961 |
| DE | 102010031380 A1 | 1/2012 |
| DE | 102014212279 A1 | 12/2015 |
| EP | 3151332 A1 | 4/2017 |

OTHER PUBLICATIONS

International Search Report, for International Application No. PCT/DE2018/000332, dated Mar. 6, 2019.

\* cited by examiner

*Primary Examiner* — An T Nguyen
(74) *Attorney, Agent, or Firm* — The Dobrusin Law Firm, P.C.

(57) ABSTRACT

A fastening device that includes a main body having a receiving region configured to receive a passive electrical component such that the main body and the electrical component are connected to one another in an electrically and/or thermally conductive manner; and a retaining device configured to at least temporarily secure the electrical component in the receiving region. The retaining device has a clamp configured to clamp the electrical component to the main body.

19 Claims, 3 Drawing Sheets

FASTENING DEVICE

The invention relates to a fastening device, having a main body which has a receiving region, wherein the receiving region is designed to receive an in particular passive electrical component in such a way that the main body and the electrical component are connected to one another in an electrically and/or thermally conductive manner, and a retaining device which is designed to at least temporarily secure the electrical component in the receiving region.

Furthermore, the invention relates to an assembly with a fastening device and an, in particular passive, electrical component, wherein the electrical component is at least temporarily secured within a receiving region of a main body of the fastening device.

In addition, the invention relates to a method for the thermally and/or electrically conductive connection of a main body to an, in particular passive, electrical component, comprising the steps of: providing a main body which has a receiving region, wherein the receiving region is designed to receive an in particular passive electrical component in such a way that the main body and the electrical component are connected to one another in an electrically and/or thermally conductive manner, and providing a retaining device which is designed to at least temporarily secure the electrical component in the receiving region.

The electrically and/or thermally conductive connection of an electrical component and a main body can serve different purposes. For example, an electrical component is attached to a main body in order to be able to detect and/or monitor the temperature of the main body by means of the electrical component. In this case, the electrical component can be designed, for example, as a thermistor.

In particular in the field of electrical circuits and electrical energy storage devices for electric and hybrid vehicles, there is a high need for inexpensive and safe thermally and/or electrically conductive connections between electrical components and different main body types. The temperature of temperature-sensitive components can thus be monitored inexpensively, so that, for example, precise temperature control can be implemented.

Various solutions are known in the prior art for providing a corresponding electrically and/or thermally conductive connection between an electrical component and a main body. For example, thermistors are glued to tin pockets on main bodies. In this case, however, the thermistor to be glued regularly floats, which results in a gap formation which ultimately does not guarantee a constant and rapid temperature transition between the main body and the electrical component.

In addition, it is known to insert thermistors in sheet metal tabs before they are filled with adhesive and/or thermal paste. The sheet then folds around the thermistor in a U-shape. With this fastening method, there is always the risk that the thermistor will be damaged during the folding process due to excessive pressure.

The object underlying the invention is therefore to allow a secure and, at the same time, inexpensive fastening of an electrical component to a main body, which electrically and/or thermally connects the electrical component and the main body to one another.

The object is achieved by a fastening device of the type mentioned at the outset, the retaining device having a deformable clamping means which is designed to clamp the electrical component to the main body.

The invention makes use of the knowledge that the risk of a gap formation between the electrical component and the main body is overcome during or after the fastening process by clamping the electrical component to the main body. The clamping means preferably exerts a clamping force on the electrical component, which presses the electrical component against the main body. In this way, it can also be avoided that the electrical component is detached from the main body in the case of additional fastening measures, such as, for example, pouring over the clamping means, the electrical component, and/or the main body with adhesive. Due to the jamming of the electrical component with the main body, the electrical component is prevented from floating when viscous substances such as adhesive are added.

In a preferred embodiment of the fastening device according to the invention, the damping means can be moved from an undeformed passive state into a deformed damped state by inserting the electrical component into the receiving region. The displacement of the damping means from the undeformed passive state into the deformed clamped state is preferably carried out by elastic bending of the damping means or a part of the clamping means. The clamping means can be transferred from the undeformed passive state to the deformed clamped state by contact with the electrical component during the insertion process or by a deflection device.

In addition, a fastening device according to the invention is advantageous in which the clamping means exerts a clamping force on the electrical component in the clamped state. The receiving region preferably has a lower receiving surface on which the electrical component rests in the inserted state. In particular, the clamping force acts in the orthogonal direction to the receiving region, so that an electrical component arranged within the receiving region is held stably in the receiving region.

In another embodiment of the fastening device according to the invention, the clamping means is designed to be elastically and in particular reversibly deformed when the electrical component is inserted into the receiving region. Alternatively or additionally, the clamping means can also be designed to be plastically deformed during the insertion of the electrical component in the receiving region. If the clamping means is deformed elastically and reversibly during the insertion of the electrical component into the receiving region, several insertion processes can be carried out without the retaining device of the fastening device being damaged. This can be necessary, for example, if the electrical component used has to be temporarily removed or replaced due to a defect or due to maintenance measures.

In another preferred embodiment of the fastening device according to the invention, the main body and the damping means have opposite contact regions which are designed to contact the electrical component inserted in the receiving region in the damped state of the clamping means, the distance between the opposite contact regions being smaller in the passive state of the damping means than in the clamped state of the clamping means. The free space between the opposite contact regions of the main body and the damping means is therefore not sufficient in the passive state of the damping means to accommodate the electrical component. By deflecting the damping means of the retaining device during the transfer of the clamping means from the passive state into the clamped state, the distance between the opposite contact regions of the main body and the clamping means is increased, so that the electrical component can be inserted into the receiving region of the main body. Because the clamping means tends to return to the passive state, but the corresponding deformation is prevented by the electrical component used, a clamping force is generated by which the electrical component is pressed against the main body by the clamping means.

In a development of the fastening device according to the invention, the clamping means is partially or completely made of plastic. The design of the clamping means made of plastic allows the implementation of different forms of clamping means, which are adapted to the respective application. In addition, a clamping means made of plastic can be elastically and reversibly deformed, Through a suitable selection of a plastic and the shape of the clamping means, the clamping force which the damping means exerts on the electrical component inserted in the receiving region can also be adjusted. Alternatively or additionally, the clamping means can be formed partially or completely from metal or a metal alloy. Clamping means made of metal or a metal alloy are particularly durable and robust against external influences and can also be used in environments or milieus in which the use of plastic is not possible.

In addition, a fastening device according to the invention is advantageous in which the clamping means is connected to the main body. In particular, the clamping means is positively, non-positively and/or integrally connected to the main body. The clamping means can also be an integral part of the main body or have been subsequently joined to the main body.

Alternatively or additionally, the retaining device can comprise a support frame, wherein the support frame can have a bottom portion. For example, the main body and its receiving region for the electrical component can be arranged above the bottom portion.

Furthermore, a fastening device is advantageous in which the damping means is injection molded onto the main body. The injection molding of a clamping means made of plastic onto the main body can be implemented inexpensively and ensures a resilient connection between the clamping means and the main body, so that even high clamping forces can be supported accordingly. In particular, the damping means is injection molded onto an outer edge of the main body. Alternatively, however, the clamping means can also be arranged in an inner region of the main body, i.e. at a distance from the outer edges of the main body.

In another preferred embodiment of the fastening device according to the invention, the clamping means is finger-shaped. In particular, the clamping means is elongated and preferably curved. The clamping means preferably has one or more legs which are connected to one another by one or more bends. The clamping means is preferably bent around a bending axis and the electrical component is elongated and has a longitudinal axis. The bending axis of the damping means and the longitudinal axis of the electrical component preferably run substantially parallel to one another. If the bending axis of the clamping means and the longitudinal axis of the electrical component run substantially parallel to one another, there is preferably an elongated axis of contact or an elongated contact surface between the clamping means and the electrical component. The elongated axis of contact or the elongated contact surface between the clamping means and the electrical component preferably runs substantially parallel to the bending axis of the clamping means and/or the longitudinal axis of the electrical component. The elongated axis of contact or the elongated contact surface between the clamping means and the electrical component can extend over a partial length or the entire length of the electrical component. The stability and robustness of the clamping of the electrical component increases with increasing length of the axis of contact or the contact surface between the clamping means and the electrical component.

In addition, the process of inserting the electrical component into the receiving region of the main body is simplified. The main body can also have a trough shape in the receiving region, in which the electrical component can be inserted, the trough shape being adapted to the shape of the electrical component. Alternatively, the bending axis of the clamping means and the longitudinal axis of the electrical component can also run substantially at right angles to one another.

In a further preferred embodiment of the fastening device according to the invention, the clamping means has a bend which preferably extends over an angular range of over 90°. The bend is preferably arranged between two substantially straight legs of the clamping means. A first leg preferably stands substantially orthogonally on the main body, wherein the second leg is inclined in the direction of the main body and projects into the receiving region of the main body.

Furthermore, a fastening device according to the invention is advantageous in which the electrical component, the clamping means, and/or the main body are covered at least partially by an adhesive layer. The adhesive layer is preferably an adhesive jacket which was produced by pouring adhesive over the electrical component and/or the clamping means. The adhesive layer preferably ensures permanent fastening of the electrical component to the main body. Due to the adhesive layer, further securing by the retaining device is ultimately no longer necessary. In this case, however, the retaining device with the deformable clamping means serves to prevent the electrical component from floating during and after the addition of the viscous adhesive. After the viscous adhesive has solidified, the adhesive layer takes on the fastening function, so that relaxation of the damping means does not impair the fastening of the electrical component to the main body.

In another advantageous embodiment of the fastening device according to the invention, the electrical component is in direct contact with the clamping means and/or the main body. Alternatively or additionally, one or more material layers, such as, for example, heat-conducting material, can be arranged between the electrical component and the clamping means, and/or between the electrical component and the main body. In addition, the electrical component, the clamping means, and/or the main body can have a coating.

In a development of the fastening device according to the invention, the main body is designed as a component of a carrier board. The main body is preferably designed as a printed circuit board. The carrier board can have one or more application-specific connection interfaces, which can be used for energy and/or signal transmission. Corresponding carrier boards and/or their components often develop high temperatures and/or are to be operated in a narrow temperature range, so that corresponding carrier boards are equipped with temperature monitors and/or temperature controls. If the electrical component is designed as a thermistor, the temperature can be monitored by means of the electrical component inserted into the receiving region of the main body and a corresponding temperature control can be implemented.

In addition, a fastening device according to the invention is advantageous in which the main body is part of an electrical energy storage or a housing of an electrical energy storage. The main body is preferably connected to a unit cell of the electrical energy storage or constitutes a component of an elementary cell. For example, the electrical energy storage is a battery of an electric or hybrid vehicle. In particular, the unit cell is a battery cell.

The object on which the invention is based is further achieved by an assembly of the type mentioned at the outset, the fastening device of the assembly according to the invention being designed in accordance with one of the embodiments described above. With regard to the advantages and modifications of the assembly according to the invention, reference is first made to the advantages and modifications of the fastening device according to the invention.

In a particularly preferred embodiment of the assembly according to the invention, the electrical component is designed as a thermistor or comprises a thermistor. Thermistors can be used for temperature detection and/or for detecting a thermal state, such that the temperature or the thermal state of the main body can be detected by means of the electrical component.

In a further preferred embodiment of the assembly according to the invention, the thermistor is designed as part of a temperature measuring device. In particular, the temperature measuring device also includes an evaluation device which evaluates the signals of the thermistor and thus determines the temperature within the receiving region of the main body.

In a further embodiment of the assembly according to the invention, it has a plurality of, in particular passive, electrical components and a plurality of retaining devices, the plurality of electrical components each being connected to the main body in an electrically and/or thermally conductive manner by means of a retaining, device. The electrically and/or thermally conductive connections and/or the fastenings of the respective electrical components on the main body can be designed in accordance with one of the embodiments described above.

In a further development of the assembly according to the invention, the main body and the clamping means have opposite contact regions which are designed to contact the electrical component inserted in the receiving region in the clamped state of the clamping means, the distance between the opposite contact regions in the passive state of the clamping means being less than the height of the electrical component. Since the height of the electrical component is greater than the distance between the opposing contact regions in the passive state of the clamping means, the deformable clamping means of the retaining device is inevitably deformed when the electrical component is inserted into the receiving region of the main body. The deformation of the clamping means ultimately leads to the generation of a clamping force which presses the electrical component onto the main body.

The object on which the invention is based is further achieved by a method of the type mentioned at the outset, the method according to the invention comprising the damping of the electrical component to the main body by means of a deformable damping means of the retaining device. With regard to the advantages and modifications of the method according to the invention, reference is first made to the advantages and modifications of the fastening device according to the invention and the assembly according to the invention.

In a particularly preferred embodiment of the method according to the invention, clamping the electrical component to the main body by means of the deformable clamping means of the retaining device comprises deforming, in particular bending, the clamping means from an undeformed passive state to a deformed clamped state by inserting the electrical component into the receiving region and/or generating a clamping force which the clamping means exerts on the electrical component in the clamped state. Alternatively or additionally, the clamping of the electrical component on the main body by means of the deformable damping means of the retaining device comprises the elastic and in particular reversible deformation of the clamping means during the insertion of the electrical component into the receiving region and/or the increase in the distance between opposite contact regions of the main body and the clamping means, which are designed to touch the electrical component inserted in the receiving region in the clamped state of the clamping means.

Furthermore, a method according to the invention is preferred in which an adhesive layer is applied at least over a portion of the electrical component, the clamping means, and/or the main body. The application of the adhesive layer at least over a portion of the electrical component, the clamping means, and/or the main body preferably comprises pouring adhesive over at least a portion of the electrical component, the clamping means, and/or the main body.

Below, preferred embodiments of the invention are explained and described in more detail with reference to the accompanying drawings. In the drawings.

Figure 1:
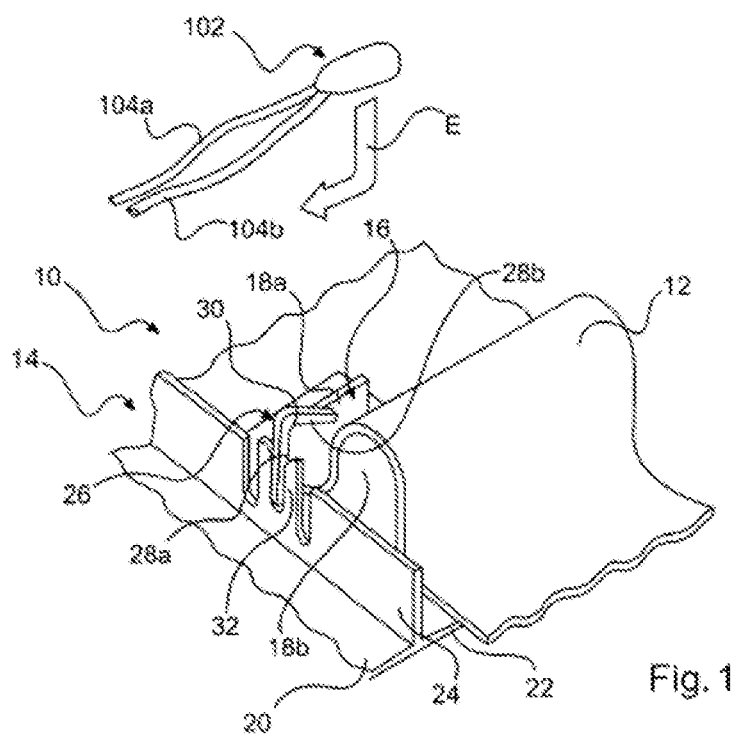
FIG. 1 shows an exemplary embodiment of the fastening device according to the invention in a perspective view.
Figure 2:
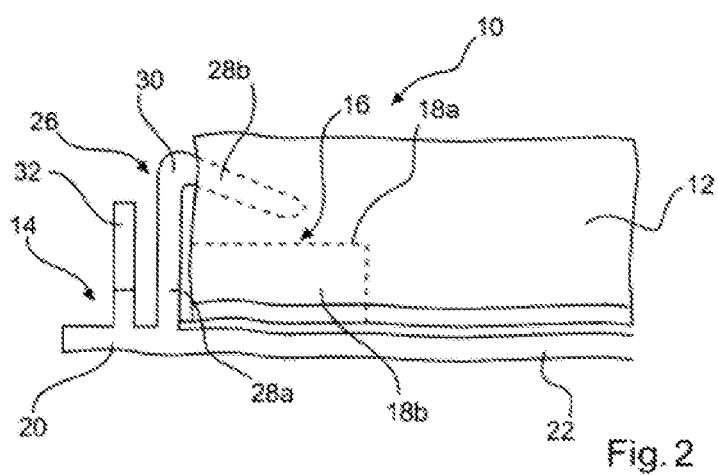
FIG. 2 shows the fastening device shown in FIG. 1 in a side view.

FIG. 1 and FIG. 2 show a fastening device 10 and a passive electrical component 102 designed as a thermistor, which is to be connected to the fastening device 10 in a thermally conductive manner.

The fastening device 10 comprises a main body 12 and a retaining device 14. The main body 12 has a receiving region 16, in which the electrical component 102 designed as a thermistor can be used in order to connect the main body 12 and the electrical component 102 to one another in a thermally conductive manner. The electrical component 102 designed as a thermistor is designed as a component of a temperature measuring device, so that the temperature of the main body 12 or the temperature within the receiving region 14 can be monitored and controlled.

To insert the electrical component 102, which is designed as a thermistor, into the receiving region 16 of the main body 12, the electrical component 102 must be moved along the direction of insertion E. Thus, the electrical component 102 is first to be moved downward in the direction of the receiving region 16 until an underside of the electrical component 102 touches a lower receiving surface within the receiving region 16. The receiving surface is delimited laterally by the portions 18a, 18b of the main body 12. After contact has been made between the underside of the electrical component 102 and the lower receiving surface within the receiving region 16, the electrical component 102 is to be pushed under a clamping means 26 of the retaining device 14.

The retaining device 14 serves to temporarily secure the electrical component 102 in the receiving region 16 until the electrical component 102 has been fastened to the main body 12 by means of an adhesive layer.

The clamping means 26 of the retaining device 14 is designed to be elastically deformable and serves to clamp the electrical component 102 to the main body 12, For this purpose, the clamping means 26 can be bent from an undeformed passive state into a deformed clamped state by inserting the electrical component 102 into the receiving region 16, The main body 12 and the clamping means 26 have opposite contact regions which, in the clamped state of the clamping means 26, touch the electrical component 102 inserted in the receiving region 16, so that the clamping means 26 exerts a clamping force on the electrical component 102 in the clamped state. The clamping force is generated because the distance between the opposite contact regions in the passive state of the clamping means 26 is less than in the clamped state of the clamping means 26.

The clamping means 26 is made of plastic and molded onto a support frame 20, The support frame 20 has a bottom portion 22. The main body 12 and its receiving region 16 for the electrical component 102 are arranged above the bottom portion 22. To provide a suitable elasticity, the clamping means 26 is finger-shaped and has a bend 30 arranged between two legs 28a, 28b. The bend 30 extends over an angular range of over 90 degrees, so that a clamping force can be generated by a corresponding deformation of the finger-shaped clamping means 26.

In addition, the support frame 20 has a web 24, the web 24 having a line clamp 32 in the region of the clamping means 26, by means of which the electrical lines 104a. 104b of the electrical component 102 can be secured.

Figure 3:
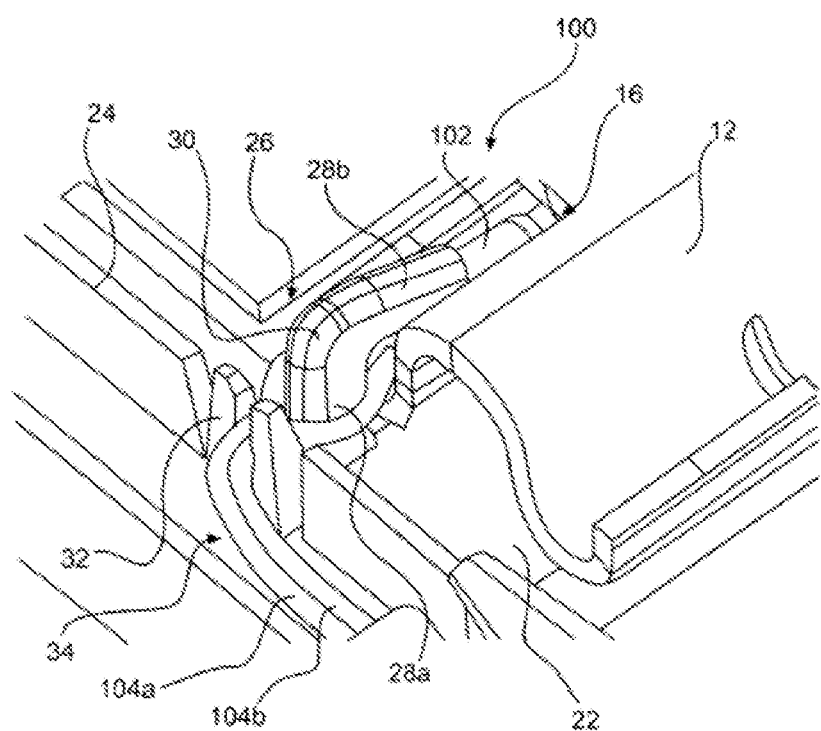
FIG. 3 shows an exemplary embodiment of the assembly according to the invention in a perspective view.

FIG. 3 shows an assembly 100 having a fastening device 10 and a passive electrical component 102 designed as a thermistor. The thermistor is designed as part of a temperature measuring device.

The electrical component 102 is secured within a receiving region 16 of a main body 12 of the fastening device 10. The electrical component 102 is in direct contact with the finger-shaped clamping means 26 and the main body 12. The main body 12 is formed as part of a carrier board. Alternatively, the main body 12 could, however, also be formed as a component of an electrical energy storage or a housing of an electrical energy storage.

The main body 12 and the damping means 26 have opposite contact regions which are designed to touch the electrical component 102 inserted in the receiving region 16 in the clamped state of the clamping means 26 shown. Since the distance between the opposing contact regions in the passive state of the clamping means 26, that is to say before the electrical component 102 is inserted, is less than the height of the electrical component 102, a damping force is generated which presses the electrical component 102 against the main body 12.

The clamping force prevents the electrical component 102 from floating up during or after the application of adhesive, as a result of which a gap would arise between the electrical component 102 and the main body 12. The clamping means 26 thus prevents the formation of gaps, so that the heat exchange between the main body 12 and the electrical component 102 is not or only insignificantly impaired by the fastening. After the adhesive has been applied, the electrical component 102, the clamping means 26 and the main body 12 in the receiving region 16 are covered by an adhesive layer. After the adhesive has solidified, the electrical component 102 is held by the adhesive in the receiving region 16 of the main body 12, so that additionally securing by the clamping means would no longer be necessary.

The electrical lines 104a, 104b run through a line clamp 32 into a line channel 34. The line channel 34 protects the electrical lines 104a, 104b from external force and thus prevents line damage.

Figure 4:
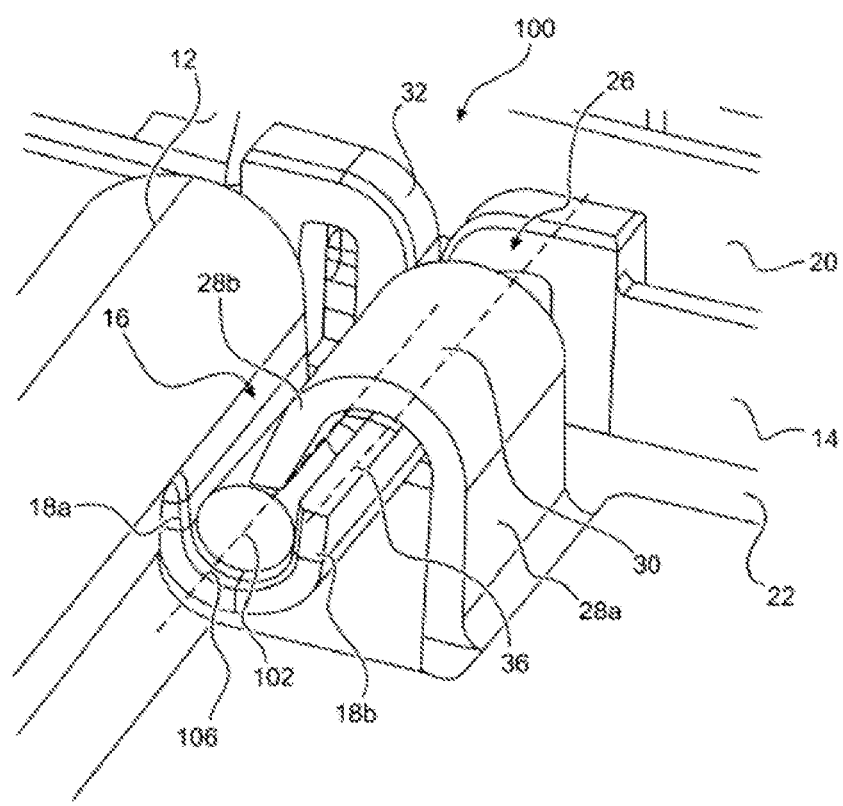
FIG. 4 shows a further exemplary embodiment of the assembly according to the invention in a perspective view.

The assembly 100 shown in FIG. 4, unlike the assembly 100 shown in FIG. 3, does not include any clamping means 26, wherein the bend 30 of which has a bending axis 36 which extends substantially at right angles to the longitudinal axis 106 of the electrical component 102. Rather, the bending axis 36 of the clamping means 26 and the longitudinal axis 106 of the electrical component 102 run substantially parallel to one another. This results in an elongated axis of contact between the electrical component 102 and the damping means 26, which runs substantially parallel to the bending axis 36 of the damping means 26 and the longitudinal axis 106 of the electrical component 102. The elongated axis of contact between the damping means 26 and the electrical component 102 extends over the entire length of the electrical component 102. The lateral arrangement of the clamping means 26 also prevents the clamping means 26 from being positioned on an end face of the electrical component 102 on which the electrical lines 104a, 104b are arranged. This prevents the electrical lines 104a, 104b from having to be spread or bent in order to extend around the clamping means 26. As a result, the risk of a load and in particular an overload of the connection between the electrical lines 104a, 104b and the electrical component 102 is considerably reduced.

REFERENCE SIGNS 10 fastening device
12 main body
14 retaining device
16 receiving region
18a, 18b portions
20 support frame
22 bottom portion
24 web
26 clamping means
28a, 28b leg
30 bend
32 line clamp
34 line channel
36 bending axis
100 assembly
102 electrical component
104a, 104b electrical lines
106 longitudinal axis
E direction of insertion

The invention claimed is:

1. Fastening device comprising:
   a main body having a receiving region configured to receive a passive electrical component such that the main body and the electrical component are connected to one another in an electrically and/or thermally conductive manner; and
   a retaining device configured to at least temporarily secure the electrical component in the receiving region;
   wherein the retaining device has a deformable clamp configured to clamp
   the electrical component to the main body so that no gap arises between the electrical component and the main body; and
   wherein an adhesive is applied to the electrical component and the main body in the receiving region to secure the electrical component in the receiving region.

2. Fastening device according to claim 1, wherein the clamp is movable from an undeformed passive state into a deformed clamped state by inserting the electrical component into the receiving region.

3. Fastening device according to claim 1, wherein the clamp is elastically deformed, or is plastically deformed, when the electrical component is inserted into the receiving region.

4. Fastening device according to claim 1, wherein the main body and the clamp have opposite contact regions that are configured to contact the electrical component when the clamp is clamped, wherein a distance between the opposite contact regions in a passive state of the clamp is less than a distance between the opposite contact regions in a clamped state of the clamp.

5. Fastening device according to claim 1, wherein the main body is designed as part of a carrier board and/or is part of an electrical energy storage or a housing of an electrical energy storage.

6. Assembly comprising:
the fastening device according to claim 1; and
the electrical component,
wherein the electrical component is at least temporarily secured within the receiving region of the main body of the fastening device.

7. Assembly according to claim 6, wherein the electrical component is configured as a thermistor or comprises a thermistor and optionally the thermistor is designed as part of a temperature measuring device.

8. Method for thermally and/or electrically connecting a main body to a passive electrical component, comprising steps of:
providing the main body which has a receiving region, the receiving region configured to receive the electrical component such that the main body and the electrical component are connected to one another in an electrically and/or thermally conductive manner; and
providing a retaining device configured to at least temporarily secure the electrical component in the receiving region; and
clamping the electrical component to the main body by means of a deformable clamp of the retaining device; and
applying an adhesive layer at least over a portion of the electrical component and the main body to secure the electrical component in the receiving region.

9. Method according to claim 8, wherein the clamping step comprises at least one of the following steps:
deforming or bending the clamping means from an undeformed passive state into a deformed clamped state by inserting the electrical component into the receiving region;
generating and exerting a clamping force on the electrical component in the clamped state;
deforming the clamp in an elastic or reversible manner during insertion of the electrical component into the receiving region;
increasing a distance between opposing contact regions of the main body and the clam, which are designed to touch the electrical component inserted in the receiving region in the clamped state of the clamping means.

10. Fastening device according to claim 1, wherein the clamp comprises a leg that extends from the main body and terminates at a terminal end that is spaced apart from the main body, wherein the terminal end is configured to contact and clamp the electrical component to the main body.

11. Fastening device comprising:
a main body having a receiving region configured to receive a passive electrical component such that the main body and the electrical component are connected to one another in an electrically and/or thermally conductive manner; and
a retaining device configured to at least temporarily secure the electrical component in the receiving region, the retaining device has a deformable clamp configured to clamp the electrical component to the main body,
wherein the clamp comprises a leg that extends from the main body and terminates at terminal end that is spaced apart from the main body, wherein the terminal end is configured to contact and clamp the electrical component to the main body; and
applying an adhesive layer at least over a portion of the electrical component and the main body to secure the electrical component in the receiving region.

12. The fastening device according to claim 11, wherein the leg bas a first section that extends from the main body in an upwardly direction to a bend, and the second section that cantilevers from the bend to the terminal end.

13. Fastening device according to claim 12, wherein the second section of the clamp extends from the bend in a downward direction back towards the main body.

14. Fastening device according to claim 11, wherein the clamp is molded onto or attached to a support frame, the support frame comprises a web having a line clamp in a region of the clamp for securing electrical lines of the electrical component.

15. Fastening device according to claim 11, wherein a bending axis of the clamp and a longitudinal axis of the electrical component run substantially parallel to one another.

16. Fastening device according to claim 11, wherein the fastening device comprises an elongated axis of contact or an elongated contact surface between the clamp and the electrical component.

17. Method according to claim 8, wherein the clamp comprises a leg that extends from the main body and terminates at a terminal end that is spaced apart from the main body, wherein
the terminal end is configured to contact and clamp the electrical component to the main body.

18. Method according to claim 8, wherein the clamp comprises a first leg, a bend, and a second leg, the first leg extends from the main body in an upwardly direction to the bend, and the second leg cantilevers from the bend to a terminal end, wherein the terminal end of the clamp is configured to contact and clamp the electrical component to the main body.

19. Method according to claim 8, wherein the method comprises:
moving the electrical component downward in a direction of the receiving region until an underside of the electrical component contacts a receiving surface within the receiving region, and after contact has been made between the underside of the electrical component and the receiving surface within the receiving region, the electrical component is pushed in a generally perpendicular direction under the clamp.

* * * * *

UNITED STATES PATENT AND TRADEMARK OFFICE
CERTIFICATE OF CORRECTION

| | |
|---|---|
| PATENT NO. | : 11,566,945 B2 |
| APPLICATION NO. | : 16/771421 |
| DATED | : January 31, 2023 |
| INVENTOR(S) | : Markus Issler and Harald Schoppel |

It is certified that error appears in the above-identified patent and that said Letters Patent is hereby corrected as shown below:

In the Claims

Column 9, Line 51 Claim 9, delete "and the clam," and insert --and the clamp--

Column 10, Line 18 Claim 12, delete "the leg bas" and insert --the leg has--

Signed and Sealed this
Twenty-eighth Day of March, 2023

*Katherine Kelly Vidal*

Katherine Kelly Vidal
*Director of the United States Patent and Trademark Office*